United States Patent [19]
Parcels

[11] 3,831,352
[45] Aug. 27, 1974

[54] DRILLING FLUID DEGASSING

[75] Inventor: Delbert Arthur Parcels, Calgary, Alberta, Canada

[73] Assignee: Keen Industries Ltd., Edmonton, Alberta, Canada

[22] Filed: July 14, 1972

[21] Appl. No.: 272,062

[30] Foreign Application Priority Data
Mar. 20, 1972  Canada .............................. 137,507

[52] U.S. Cl. ................................... 55/193, 55/199
[51] Int. Cl. ........................................... B01d 19/00
[58] Field of Search ......... 55/52, 55, 189, 193, 199, 55/203, 218

[56] References Cited
UNITED STATES PATENTS

| | | | |
|---|---|---|---|
| 2,070,453 | 2/1937 | Rodman................................. | 55/52 |
| 2,142,270 | 1/1939 | Vander Henst........................ | 55/193 |
| 2,507,797 | 5/1950 | Martin.................................. | 55/52 X |
| 2,714,308 | 8/1955 | Heck..................................... | 55/199 X |
| 3,055,743 | 9/1962 | Anderson............................. | 55/193 X |

Primary Examiner—Samih N. Zaharna
Assistant Examiner—Richard W. Burks
Attorney, Agent, or Firm—Stevens, Davis, Miller & Mosher

[57] ABSTRACT

A drilling mud degasifier includes a chamber within which a sub-atmospheric pressure is maintained. Gasified mud enters the chamber and encounters a rotating impeller which agitates the mud and flings it into the chamber interior where such mud strikes a plurality of baffles thus exposing a large surface area of mud to the low pressures within said chamber and effecting degasification of same.

10 Claims, 5 Drawing Figures

DRILLING FLUID DEGASSING

BACKGROUND OF THE INVENTION

This invention relates to drilling fluid degasification. More particularly, it relates to a method and apparatus for degassing drilling mud or fluid in a well drilling operation.

When drilling a deep well, it is standard practice to maintain a column of drilling fluid or "mud" for the purpose of providing a hydrostatic pressure throughout the well bore which is sufficient to counteract the pressure of any gas-bearing zone or formations drilled into. Gas from a gas-bearing formation will enter into the well bore if the formation pressure is greater than the hydrostatic pressure exerted by the column of fluid or drilling mud in the well bore. When these gases come into contact with the drilling fluids, the gas becomes entrained in the fluid; that is, the drilling fluid or mud becomes gasified. If this entrained gas is not removed and recirculation of the drilling fluid is continued, the entrained gases within the drilling fluid will, in effect, decrease the specific gravity of the drilling mud and thus decrease the available hydrostatic pressure within the well bore. If this condition is allowed to continue the formation pressure may overcome the pressure of the column of drilling fluid and thus permit the gas to reach the surface. Excessive pressures may reach the surface too rapidly to be controlled thus resulting in a very costly and dangerous "blow-out" situation.

There are two known methods for maintaining the necessary hydrostatic pressure of the column of drilling fluid in circumstances where gases are entering the bore hole from a formation. The first involves the addition of material having a high specific gravity to the gasified drilling fluid in an attempt to offset the decrease in specific gravity of the drilling fluid due to the entrainment of gas therein. This method is very costly and difficult to control due to the fact that this material must be added at a rapid rate. This often creates very heavy spots of high specific gravity material throughout the column of drilling fluid, which condition is termed "slugging." This "slugging" can overcome the formation pressure in the drilling hole, which in turn can be responsible for what is termed "lost circulation." That is to say, the very heavy drilling fluid can break the formation down and flow into it instead of circulating back to the surface. The mud or fluid column in the well will be shortened and sealed-off zones at a higher level may break through and start flowing thus giving rise to a "blowout." In addition, broken down formations may cause sticking of the drill collars and pipe with the attendant risk of losing the hole altogether.

Because of the obvious disadvantages of the above-described method, the prior art has provided various ways and means of removing at least some of the entrained gas from the drilling fluid before reintroducing same to the drill hole.

Several different types of drilling fluid degassers are presently being used in the oil and gas drilling industries, with varying degrees of success. One common objection to them is that they tend to be very cumbersome and relatively expensive. Prior art mud degassers typically weigh from about 4,000 to about 6,000 pounds and are thus very cumbersome to handle when being placed on and off the drilling rig. In addition the bulk of these units require expensive pumping equipment and/or storage tank arrangements for the mud.

SUMMARY OF THE INVENTION

A primary object of the present invention is to provide improved apparatus and methods for degassing drilling fluids or mud, the apparatus being extremely simple in construction, easy to operate, and yet at the same time being extremely effective in removing the entrained gases from the drilling fluid or mud passing therethrough.

In accordance with one aspect of the invention there is provided a drilling fluid degassing unit which includes a chamber having drilling fluid inlet and exit means. An agitator is arranged to intercept incoming drilling fluid and to violently agitate this fluid and fling it into the chamber interior. Baffles are mounted within the chamber in selected locations to intercept this drilling fluid which has been flung by the agitator whereby the fluid splashes against the baffles before dropping by gravity into a lower portion of the chamber. Means are provided for drawing off gases from the chamber interior which have been released from the drilling fluids and for maintaining a sub-atmospheric pressure in said chamber.

The broad overall concept of agitating drilling mud by impellers is not new; however, in general, the prior art impellers have been arranged such that they agitate the mud at a level below the mud level within the degassing unit chamber. This results in a "smothering" action with the result being that much of the effectiveness of the agitation is lost.

The present invention, on the other hand, provides for the elimination of this smothering action and, in a typical embodiment, provides for the impeller to be arranged so that the mud may be flung freely upwardly therefrom into the chamber interior so that it splashes against the baffles and spreads in relatively thin layers thereover thus exposing as much surface as possible to the low pressure atmosphere maintained within the chamber.

Various other important features of the apparatus aspect of the invention will become apparent from a description of a preferred embodiment of the invention which follows hereinafter.

In accordance with a further aspect of the invention there is provided an improved method of degassing drilling fluids. The method includes the steps of introducing fluids to a chamber having a region of sub-atmospheric pressure therein and violently agitating said fluid and flinging same into said region of sub-atmospheric pressure. Baffles are provided in the chamber against which said fluid splashes thus to intimately expose the fluid to the action of the sub-atmospheric pressure whereby gases entrained in the fluid escape from same. The fluid is thereafter collected together and passed outwardly of the chamber.

BRIEF DESCRIPTION OF THE DRAWINGS

The various features of the invention will be more clearly understood from a reading of the following description of a preferred embodiment of the invention wherein reference is made to the drawings wherein.

DESCRIPTION OF THE PREFERRED EMBODIMENT

Figure 1:
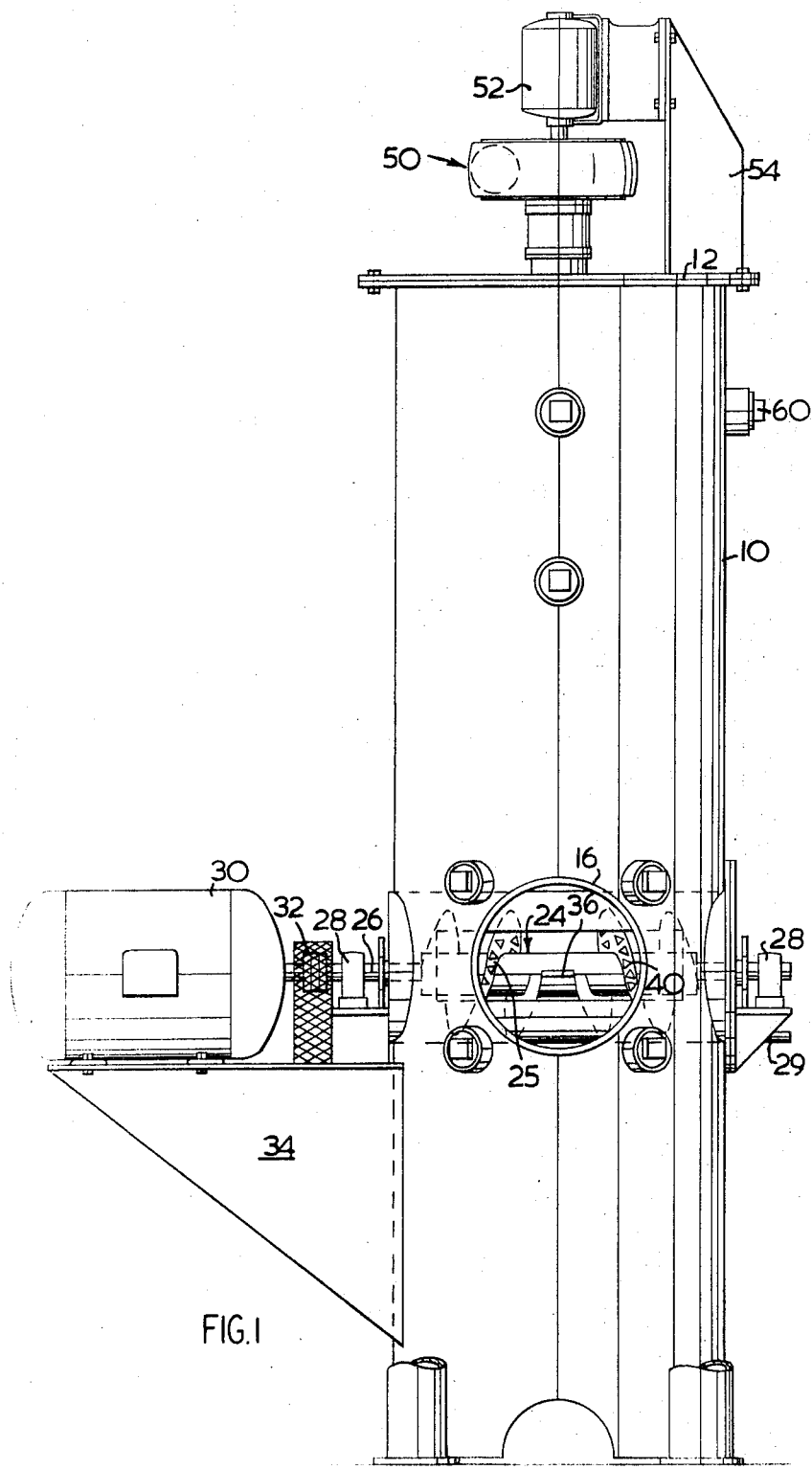
FIG. 1 is a front elevation view of a drilling fluid degassing unit according to the present invention.
Figure 2:
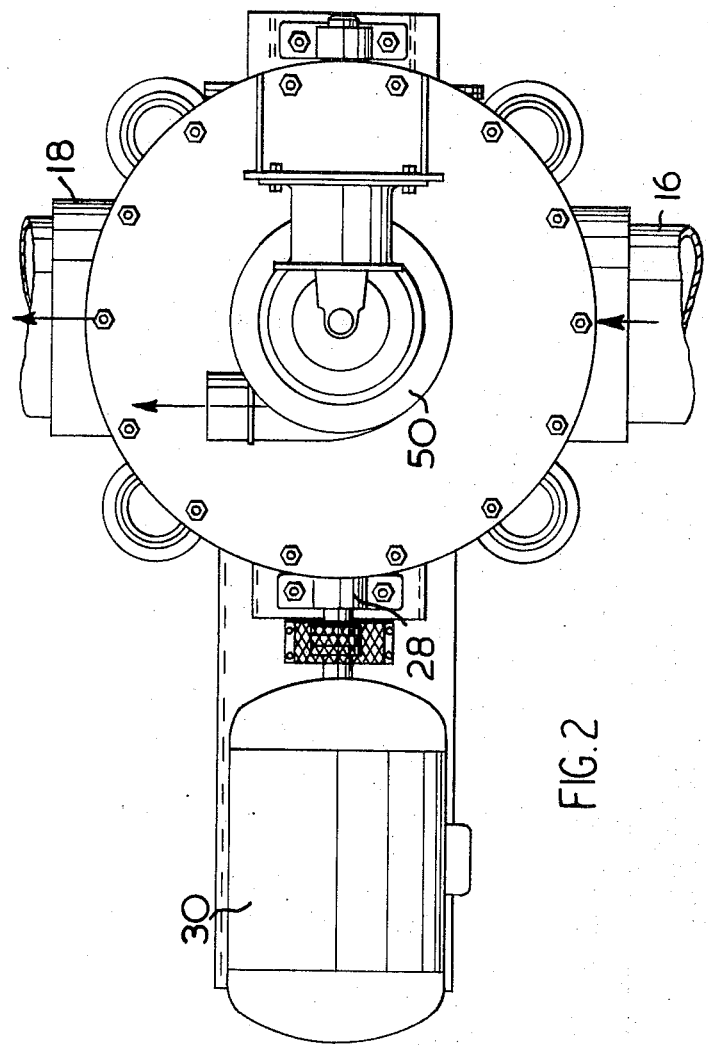
FIG. 2 is a plan view of the degassing unit of FIG. 1.

With reference to the drawings it will be seen that the drilling mud degasser includes an upright elongaged cylindrical chamber 10 closed at its upper and lower ends by suitable closure plates 12 and 14. Located generally in the lower one-third of the upright chamber 10 is an inlet 16 for gas-bearing drilling fluids. On the other side of the chamber or casing 10 there is provided an exit 18 for the treated, degassed drilling fluids; exit 18 is positioned at a level below that of the level of the inlet 16.

Figure 3:
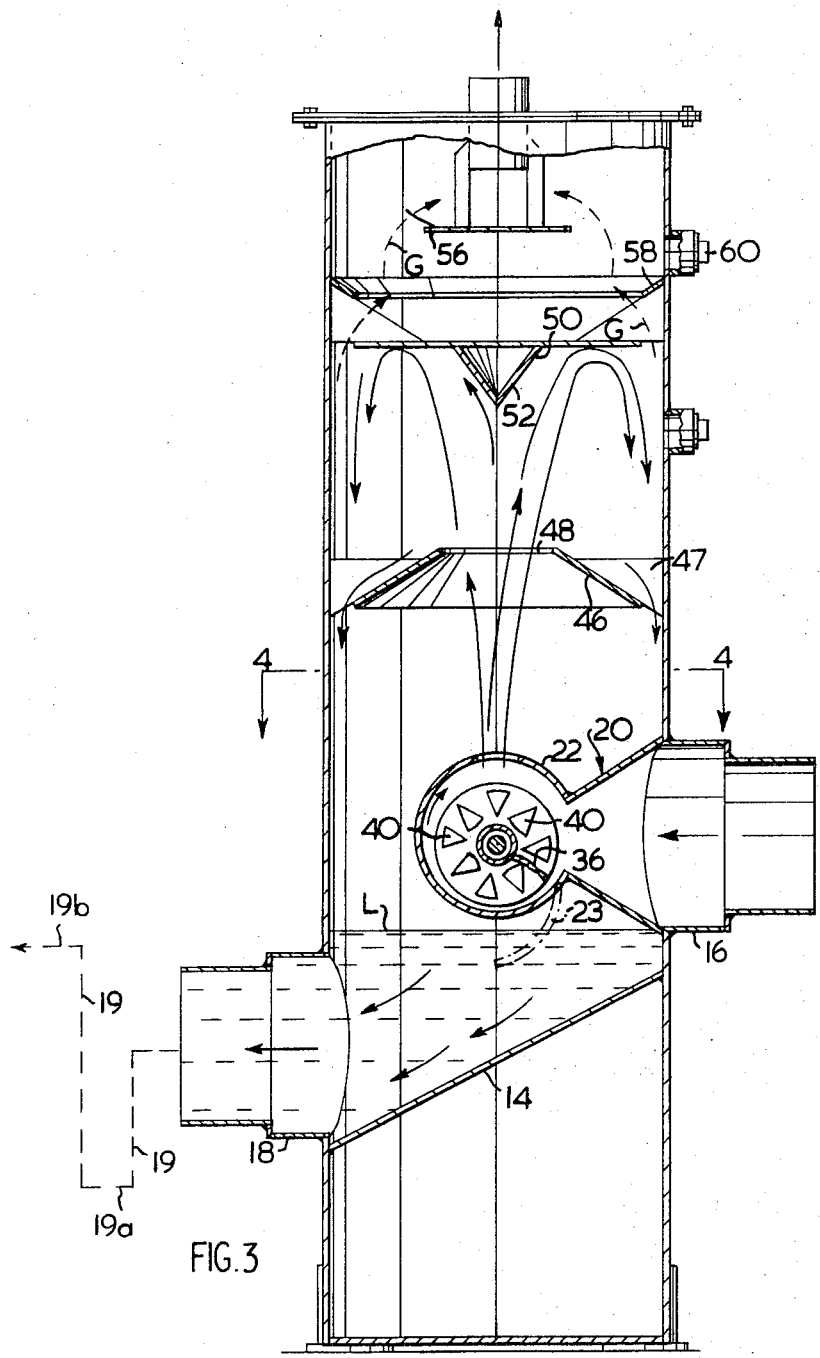
FIG. 3 is a side elevation view of the degassing unit partly in section whereby to show the interior structure.

The inlet 16 is connected via a transition section 20 to an impeller housing 22. As best seen in FIG. 3 the impeller housing 22 is of generally circular cross-section and extends horizontally completely across the chamber 10 with the ends of the housing 22 being welded to the side walls of such chamber.

Mounted within housing 22 is the impeller 24. The impeller 24 is mounted on the shaft 26 which extends outwardly of the chamber 10, with its opposing ends being mounted in bearings 28 which are connected by suitable bracket means to chamber 10. The impeller shaft 26 is connected to a drive motor 30 via a coupling 32. Drive motor 30 is mounted on a support bracket 34 attached to the side wall of chamber 10.

The impeller 24 is provided with a pair of oppositely directed spiral vanes 25 which start at opposing ends of the impeller and spiral toward one another in opposite directions about the axis of the impeller. These two vanes approach each other at the mid point of the length of the impeller and they are interconnected by a radially extending plate element 36. In order to reduce the fluid drag on the impeller and to increase the degree of agitation of the incoming mud, the impeller vanes are provided with a plurality of small openings 40 therealong.

Figure 4:
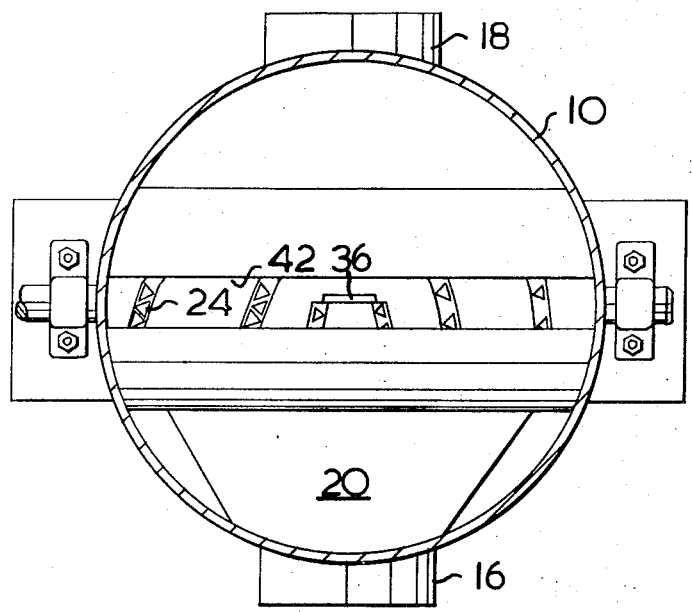
FIG. 4 is a cross-sectional view taken along section line 4—4 of FIG. 3 and illustrating the impeller housing.
Figure 5:
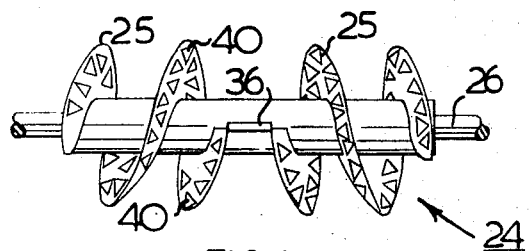
FIG. 5 shows the impeller per se.

It will be noted from FIGS. 3 and 4 that the upper side of the impeller housing 22 is provided with an elongated slot 42. The slot preferably extends substantially the entire length of impeller housing 22 although it can, in fact, be made considerably shorter. Thus, as the impeller 24 is driven in rotation by motor 30, the gasified mud entering inlet 16 is gathered by the impeller vanes toward the mid point of the impeller and, at the same time as such mud is being violently agitated by the action of the perforated impeller vanes, it is flung violently upwardly through the elongated slot 42 in the impeller housing thus passing upwardly in a generally unimpeded fashion towards the top of the chamber 10.

As best seen in FIG. 3, the upper one-half of the chamber 10 is provided with a plurality of baffle means against which the upwardly moving mud strikes, which baffle means will now be described.

The baffles which are provided comprise a first baffle means 46 in the form of a truncated conical plate which is spaced a distance above the impeller housing 22. This baffle 46 has a sizable aperture 48 centrally located therein so that most of the mud flung upwardly by the impeller 24 passes through this opening 48 and thus strikes against a further baffle 50 provided a distance above the first baffle 46. Baffle 50 comprises a circular generally flat plate which is provided with a downwardly directed conical element 52 disposed centrally thereof. Thus, the upwardly moving mud strikes against the surface of conical element 52 and also against the flat surface of baffle 50. The conical element 52 serves to deflect the mud radially outwardly and from there forces of gravity cause the mud to turn around and to fall downwardly onto the sloping upper surface of the truncated conical baffle 46. Since baffle 46 is supported on spaced brackets 47 and is so dimensioned such that its outer edges are radially spaced from the inner surface of chamber 10, the downwardly moving mud can readily pass between the outer edges of the baffle 46 and the casing and thence drop downwardly towards the bottom of the chamber.

During all of the time that the mud is being violently agitated and flung upwardly as described above, gases are continually being drawn off from the interior of chamber 10 by means of an exhaust fan arrangement 50 mounted at the top of the casing. The exhaust fan 50, which is, per se, of conventional construction is driven by a motor 52 and the whole assembly is supported by bracket means 54 connected to the top of chamber 10.

It will be seen from FIG. 3 that the inlet to the exhaust 50 is provided with a suitable baffle 56 which together with annular baffle 58 serves to reduce the possibility of any mud, which may somehow or other have passed above the baffle 50, from entering into the exhaust fan. The baffle 50, being spaced slightly from the walls of chamber 10, does not, of course, offer any obstruction to the flow of gases G past the same and hence the entire interior of the region defined by casing 10 is exposed to a sub-atmospheric pressure. The violent agitation of the mud and the subsequent rapid upward movement of same through the chamber interior and the splashing of the same against the baffles, serves to expose as much surface area of mud to the low pressure as possible and thus effects removal of a very large percent of the entrained gases from the mud.

In operation, the level of treated or degasified mud within casing 10 is kept below the level of the impeller as represented by the dashed line L in FIG. 3. It is important to keep the mud level below that at which a "smothering" action occurs i.e., there must be no interference with the mud being flung upwardly from the impeller housing if good results are to be achieved. Thus the outlet pipes connected to exit 18 (shown diagramatically by dashed lines 19) are arranged to form a liquid trap to prevent entry of atmospheric air into chamber 10 via exit 18 and maintain the level L of the mud. Since the low point 19a of the outlet pipe 19 is well below the level L of the mud in chamber 10 entry of air into the latter is prevented. The level L of mud in chamber 10 is higher than the level of the high point 19b by an amount proportional to the degree of sub-atmospheric pressure in the chamber.

An operational feature on impeller housing 22 is the provision of a hinged bottom gate 23 (shown in the open position in dashed lines in FIG. 3) which is mounted on a shaft 29 as shown in dashed lines in FIG.

1. This gate is opened when there is no need to effect degasification of the drilling mud i.e., it acts to bypass incoming drilling mud directly through to the exit 18 thus acting to conserve power etc. when there is no need to effect the degasification. This arrangement eliminates complex bypass valves and lines around the degasifier which equipment is generally required in prior art apparatus.

It will also be noted that the chamber 10 is provided with a plurality of removable plugs 60. The lowermost of these plugs may be removed for connection of lines to permit introduction of chemicals and water into the bottom of the chamber for admixture with the mud for known purposes. One or more of the upper plugs 60 may be removed and a regulator valve or orifice installed whereby to assist in maintaining a relatively constant sub-atmospheric pressure in the chamber 10. This is particularly useful when the mud being processed has little gas entrained therein; under these circumstances an overly high vacuum could build up in the chamber unless a controlled flow of atmospheric air was permitted to enter. The above mentioned regulator valve or orifice permits a controlled flow of air to enter and thus assists in maintaining the sub-atmospheric pressure in the chamber within reasonable upper and lower limits.

The many advantages of the arrangement described will be apparent to those skilled in the art. The degassing unit is extremely simple and light in weight. The number of moving parts is very small and there is no need to provide expensive mud pumping equipment such as is required by many prior art degasifiers, that is, the present degassing unit can receive low pressure mud directly from the flow line coming from the top of the drill hole. The violent agitation and the splashing of the fluid against the baffles according to the invention provides very effective degasification.

An embodiment of the invention has been described in detail for the purposes of illustration, but it will be obvious that numerous modifications and variations may be resorted to without departing from the spirit of the invention.

I claim:

1. A drilling fluid degassing unit comprising a chamber having a drilling fluid inlet and a drilling fluid exit, means for withdrawing gases from and providing a sub-atmospheric gaseous pressure within said chamber, a rotary impeller arranged to intercept incoming drilling fluid and means for rotating said impeller to agitate said fluid and fling it into the chamber interior, baffle means defined within said chamber and arranged to intercept the drilling fluid which has been flung into the chamber interior whereby said fluid splashes against said baffle means thus exposing a relatively large area of the fluid to said sub-atmospheric pressure and causing gas entrained in said fluid to escape therefrom before said fluid moves by gravity towards a lower portion of the chamber and wherein a housing surrounds said impeller, means connecting said fluid inlet to said impeller housing to admit drilling fluid thereto, said impeller housing having an opening therein communicating with the chamber interior and facing toward said baffle means, said housing being constructed to permit substantially all the drilling fluid which has entered said housing to be flung freely outwardly thereof through said opening and to pass in generally unimpeded fashion toward said baffle means upon rotation of the impeller.

2. A degassing unit according to claim 3 wherein said baffle means include first and second baffles located above said impeller in vertically spaced apart relation, the first baffle having an opening above said opening in the impeller housing and through which fluid flung by the impeller passes, and the second baffle arranged to intercept the fluid which has passed through the opening in the first baffle, said first baffle further being arranged such that it intercepts fluid falling downwardly by gravity from the second baffle as it passes toward a lower portion of the chamber.

3. A degassing unit according to claim 1 wherein said means for providing the sub-atmospheric pressure in said chamber comprise a suction fan.

4. The degassing unit according to claim 3 wherein said impeller has oppositely directed spiral vanes thereon.

5. The degassing unit according to claim 1 wherein said impeller housing is provided with a by-pass gate therein, which, when open, serves to by-pass the drilling fluid from the fluid inlet directly towards a lower portion of said chamber.

6. A degassing unit according to claim 1 wherein said chamber is elongated and disposed in a generally upright position, and wherein the baffle means are disposed above said impeller housing in spaced relation thereto.

7. A degassing unit according to claim 1 in combination with means for maintaining a level of drilling fluid in a lower portion of the chamber below that level at which interference with the drilling fluid being flung into the chamber would occur.

8. A drilling mud degassing system comprising an elongated upright enclosed chamber having a mud inlet and a mud outlet arranged in lower portions of said chamber, means for withdrawing gases from and providing a sub-atmospheric pressure in said chamber, an impeller housing arranged in a lower portion of said chamber and in fluid communication with said mud inlet, a rotary impeller arranged in said housing and means for rotating said impeller, baffle means defined in upper portions of said chamber and fixed relative thereto, said impeller housing having an opening in an upper portion thereof with said impeller and said housing being constructed and arranged to permit substantially all the gasified mud coming through said inlet to be first agitated by the impeller and then flung freely upwardly therefrom through said opening in the housing from whence said mud passes through the chamber interior in unimpeded fashion towards the upper portions of the chamber and splashes against said baffles to expose the mud to the sub-atmospheric pressure in said chamber and effect removal of gases therefrom, said mud then dropping by gravity to a lower portion of said chamber, and means for maintaining the level of degasified drilling mud in the lower portion of the chamber below the opening in said impeller housing to assist in permitting the mud to be freely flung or thrown into the chamber interior.

9. The system according to claim 8 wherein said impeller housing and said impeller are generally horizontally disposed, said impeller including spiral means thereon arranged to gather the mud toward the midpoint of the impeller upon rotation of the impeller.

10. The system according to claim 8 wherein said baffle means include a first baffle having a central opening therein through which the upwardly passing mud travels, and a further baffle above the first baffle having means to deflect the mud radially outwardly with said mud then falling downwardly by gravity, said first baffle having sloping upper surfaces arranged to intercept the falling mud whereby the mud spreads outwardly thereover with said upper surfaces being sloped toward the wall of the chamber and outer edge portions of the first baffle being spaced from the chamber walls so that the mud can pass therebetween after flowing over said sloping upper surfaces and thence fall to said lower portions of the chamber.

* * * * *